United States Patent
Chang

(10) Patent No.: US 8,116,682 B2
(45) Date of Patent: Feb. 14, 2012

(54) NEAR FIELD COMMUNCATION DEVICE

(76) Inventor: Tang-Hsien Chang, Taipei (TW)

( * ) Notice: Subject to any disclaimer, the term of this patent is extended or adjusted under 35 U.S.C. 154(b) by 383 days.

(21) Appl. No.: 12/585,810

(22) Filed: Sep. 25, 2009

(65) Prior Publication Data

US 2011/0076943 A1 Mar. 31, 2011

(51) Int. Cl.
*H04B 5/00* (2006.01)

(52) U.S. Cl. ... 455/41.1; 455/41.2; 455/558; 455/556.1; 340/572.1; 340/572.7; 379/433.09

(58) Field of Classification Search ............... 455/41.1, 455/41.2, 558, 556.1
See application file for complete search history.

(56) References Cited

U.S. PATENT DOCUMENTS

| | | | | |
|---|---|---|---|---|
| 7,471,200 B2* | 12/2008 | Otranen | ............... | 340/572.1 |
| 7,590,384 B2* | 9/2009 | Dawidowsky | ............... | 455/41.1 |
| 7,657,255 B2* | 2/2010 | Abel et al. | ............... | 455/414.1 |
| 7,762,470 B2* | 7/2010 | Finn et al. | ............... | 235/492 |
| 7,778,603 B2* | 8/2010 | Palin et al. | ............... | 455/41.2 |
| 7,801,486 B2* | 9/2010 | Barnier | ............... | 455/41.2 |
| 7,821,399 B2* | 10/2010 | Otranen | ............... | 340/572.1 |
| 7,822,439 B2* | 10/2010 | Teicher | ............... | 455/558 |
| 8,060,627 B2* | 11/2011 | Rosenblatt et al. | ........... | 709/228 |
| 2010/0151790 A1* | 6/2010 | Hoeksel et al. | ............... | 455/41.2 |

* cited by examiner

*Primary Examiner* — Marceau Milord
(74) *Attorney, Agent, or Firm* — Bacon & Thomas, PLLC

(57) ABSTRACT

The present invention relates to a near field communication device containing a ZigBee communication module circuit linking with a Bluetooth communication module. A ZigBee module is equipped with a master central processing unit (CPU) to identify N-Fi communication protocol and enable wireless communication. The master CPU is connected with a communication chip to transmit or receive packets, and includes a ZigBee memory to store the packets temporarily. Besides, the master CPU is linked with a signal conversion/transmission circuit to enable internal exchange of information packets with the Bluetooth communication module. The Bluetooth communication module has a Bluetooth master CPU to control Bluetooth communication, and is connected with a Bluetooth communication chip to transmit and receive Bluetooth-based packets. Thus, the embedded Bluetooth module can be used to connect the electronic device that includes a ZigBee module to carry out transmission of NFC signals.

13 Claims, 8 Drawing Sheets

NEAR FIELD COMMUNCATION DEVICE

BACKGROUND OF THE INVENTION

1. Field of the Invention

The present invention relates to a near field communication (NFC) device, which combines a Bluetooth communication module and a ZigBee communication module into an electronic device to enable NFC over the distance of 100 to hundreds of meters without support from ISP (internet service provider).

2. Description of the Prior Art

As the electronic device industry has developed very rapidly over recent years, remote wireless communication is necessary to transmit information between devices, and is achieved mainly by ISP through 2G/3G/3.5G to transfer information packets of voices, short messages, video data or information codes to receiving ends anywhere without boundaries. But a problem arises in the process: ISP shall be paid for transmission services. However, near field communication (NFC) is enabled chiefly by using the blue-tooth wireless communication capability embedded in electronic devices for exchange of information between these devices, including exchange of information packets of voices, short messages, video images or information codes, etc., and does not need support from ISP. In this context, the transmission coverage ranges from several meters to tens of meters, depending on the power of blue-tooth wireless communication devices. As for NFC (it enables wireless communication within hundreds of meters around) the communication technology that enables wireless transmission or receipt of information packets in electronic devices over the distances of up to hundreds of meters without support from ISP.

Usually, there are two types of wireless communication applications for common electronic wireless communication devices: one is 2G/2.5G/3G/3.5 G communication mode provided by ISP for mobile communication devices, with which one electronic device will exchange information packets with another successfully, as long as the two devices fall under the service area of ISP, no matter what the distance between them is; and the other type is that the mobile communication devices has the Bluetooth transmission capability, which allows these devices to communicate information packets with another electronic communication equipment, e.g. mobile communication device or host computer, over the distance of several meters to tens of meters.

Refer to FIG. 6, which is a block diagram illustrating communication of a conventional Bluetooth device. In Step A, the Bluetooth device enters into a Standby mode after powered on; in Step B, it detects if there is another Bluetooth device to be connected by using a Bluetooth inquiry program; in Step C, it connects a specific Bluetooth device by using a mutual password confirmation (Page) program; in Step D, the Bluetooth device enters into the Connected mode following password confirmation; proceed to Step E in the information transmission mode if there are information packets to be transmitted, and if there is no information to be delivered, proceed to Step F, and the Bluetooth device will enter into a Sleep mode. If it is necessary to transmit an information packet, the Bluetooth device will return to Step E and transmit the information.

In a conventional Bluetooth network architecture, the standard of Bluetooth is defined in IEEE 802.15.1, the device that makes an active request for connection is a Bluetooth server, while the device that is requested to be connected is a Bluetooth client. A Bluetooth server can connect several Bluetooth clients (up to seven Bluetooth clients are allowed to be linked in the present Bluetooth technology) in active mode to create a piconet, and Bluetooth devices in different piconets can constitute a different network topology—scatterent.

SUMMARY OF THE INVENTION

For conventional mobile communication devices, wireless communication is enabled by ISP or the Bluetooth capability of these devices to exchange information packets with each other. In NFC applications, however, as they exceed the communication range of common Bluetooth-enabled devices, only the communication channels provided by ISP can be used for delivery of information packets, but user have to pay monthly rental fees or transmission fees to ISP for such service.

The primary object of the present invention is to integrate a Bluetooth communication module into an electronic communication device, which sends information packets from its Bluetooth port to the Bluetooth communication module of an NFC device inside it. Through a signal conversion and transmission circuit of the NFC device, the information packets will be delivered to the ZigBee communication module of the NFC device, which will transmit these packets to another NFC device in the NFC range of the electronic communication device. In this way, the NFC architecture of the electronic device will be established, in which the ZigBee communication module can form a near field local area network (LAN) by Ad Hoc Networking Access, and at the same time, can actively exchange information with many other ZigBee communication modules (more than seven modules are available by the present ZigBee communication technology) in the LAN. Even in the passive mode, the ZigBee communication module can receive information from at least seven ZigBee communication modules.

The secondary object of the present invention is to include a ZigBee communication module, a Bluetooth communication module and a signal conversion and transmission circuit in an NFC device. The Bluetooth communication module is embedded in an electronic device to enable wireless communication between the electronic device and the Bluetooth communication module in the NFC device, and the Bluetooth conversion circuit has the RFCOMM capability. Thus, the Bluetooth communication module is able to connect the ZigBee communication module of the NFC device by using the signal conversion and transmission circuit. Based on the fact that the wireless communication range of the ZigBee communication module reaches hundreds of meters, after receiving information packets from another ZigBee communication module, the ZigBee communication module will transmit these packets to the Bluetooth communication module of the NFC device through the signal conversion and transmission circuit of the NFC device. Then, the Bluetooth communication module of the NFC device will send these information packets to the Bluetooth port of the electronic device for receiving purpose.

A further object of the present invention is to make an NFC device communicate with any Bluetooth-enabled electronic device, so that the electronic device can communicate information packets with another electronic device that also includes the NFC device or ZigBee communication module in the proximity by wireless communication without support from ISP, thus allowing many groups of NFC-enabled mobile communication equipments or electronic devices with the built-in ZigBee communication module to form an NFC network.

Another object of the present invention is to apply NFC devices to enable near field informatics (N-Fi) which includes 4 major application systems, namely, near field life information sharing system, near field chat and dating system, near field online gaming system and near field short message springboard sending system. The near field life information sharing system allows department stores, shops, restaurants, hotels, private or public stores or units to use NFC devices anywhere to connect electronic devices that are equipped with display screens or can communicate information with these NFC devices, including general computers, notebook computers, common and smart mobile phones, PDA mobile phones and on-board units (OBU) or roadside facilities, so that they can continuously release information on clothing, food, shelter, transportation and entertainment, such as shopping advertisements, promotions, auctions and transactions, traffic condition or public notices, etc. in the communication area covered by the NFC devices. Usually, users can get such information through near field wireless transmission between NFC devices, and then use the NFC devices they have to transfer such information to general PCs, notebook PCs, common and smart mobile phones, PDA mobile phones, OBUs or other electronic devices that can display or process information.

With the near field chat and dating system, users can use NFC devices to connect general PCs, notebook PCs, common and smart mobile phones, PDA mobile phones, OBUs or other electronic devices that are equipped with display screens or can exchange information with the NFC devices, so as to continuously release personal information, such as information namecards or ID information. Other NFC device users within the communication range of these NFC devices can receive such personal information and display it in electronic devices with display screens, including general and notebook PCs, common and smart mobile phones, PDA mobile phones and OBUs. With the mechanism for release of personal information, such as information namecards or ID information, users can learn if the personal information to be released is available over the distance of hundreds of meters; they can also chat with other NFC device users within the communication range by using these NFC devices.

The near field online gaming system comprises dual-player online games, multiplayer online games and near field virtual reality games, wherein the dual-player online games allow users to play one-to-one dual-player online games with other NFC device users by using their NFC devices, while the multiplayer online games enable users to play one-to-many multiplayer online games with other NFC device users by using their NFC devices, or provide online access for users and other NFC device users to a NFC-enabled game server and play many-to-many multiplayer online games at the same time. That is to say, the NFC-enabled game servers are distributed over the real world, and a master server is used to connect the NFC-enabled game servers distributed over the world, so that the architecture for near field virtual reality games can be established where users have different gaming tasks or gaming triggers through connection to different NFC-enabled game servers, and circulation of virtual currencies and properties is enabled.

In the near field short message springboard sending system, short messages are sent by users with their NFC devices to individual designated NFC device users through 3 kinds of communication channels: the first is by utilizing the common near field short message transfer function, with which users rely on the NFC devices they hold to send short messages directly to NFC devices owned by the individual designated users; the second is by relying on the near field near-end springboard sending function, with which short messages are sent first to a nearby NFC device, which will then transfer the short messages to the NFC devices owned by individual designated users; and the third is by relying on the near field far-end springboard sending function, with which short messages are sent to an NFC device controlled by or connected with a centre that records these messages. When short message receivers hold the personal information contained in the NFC device and occur in the communication range of the NFC devices controlled by or connected with the centre, the short messages recorded by the centre will be delivered from the NFC devices to the short message receivers. Therefore, if NFC device users want to send short messages beyond the communication range of the NFC devices, the short messages will be sent to receivers by utilizing the near field near-end or far-end springboard sending functions.

DETAIL DESCRIPTION OF THE INVENTION

The aforesaid configurations, platform, techniques of many (at least seven) application systems and their features and advantages of the present invention will be described in detail by referring to the accompanying drawings used to illustrate an example of the preferred embodiment of the present invention.

Figure 1:
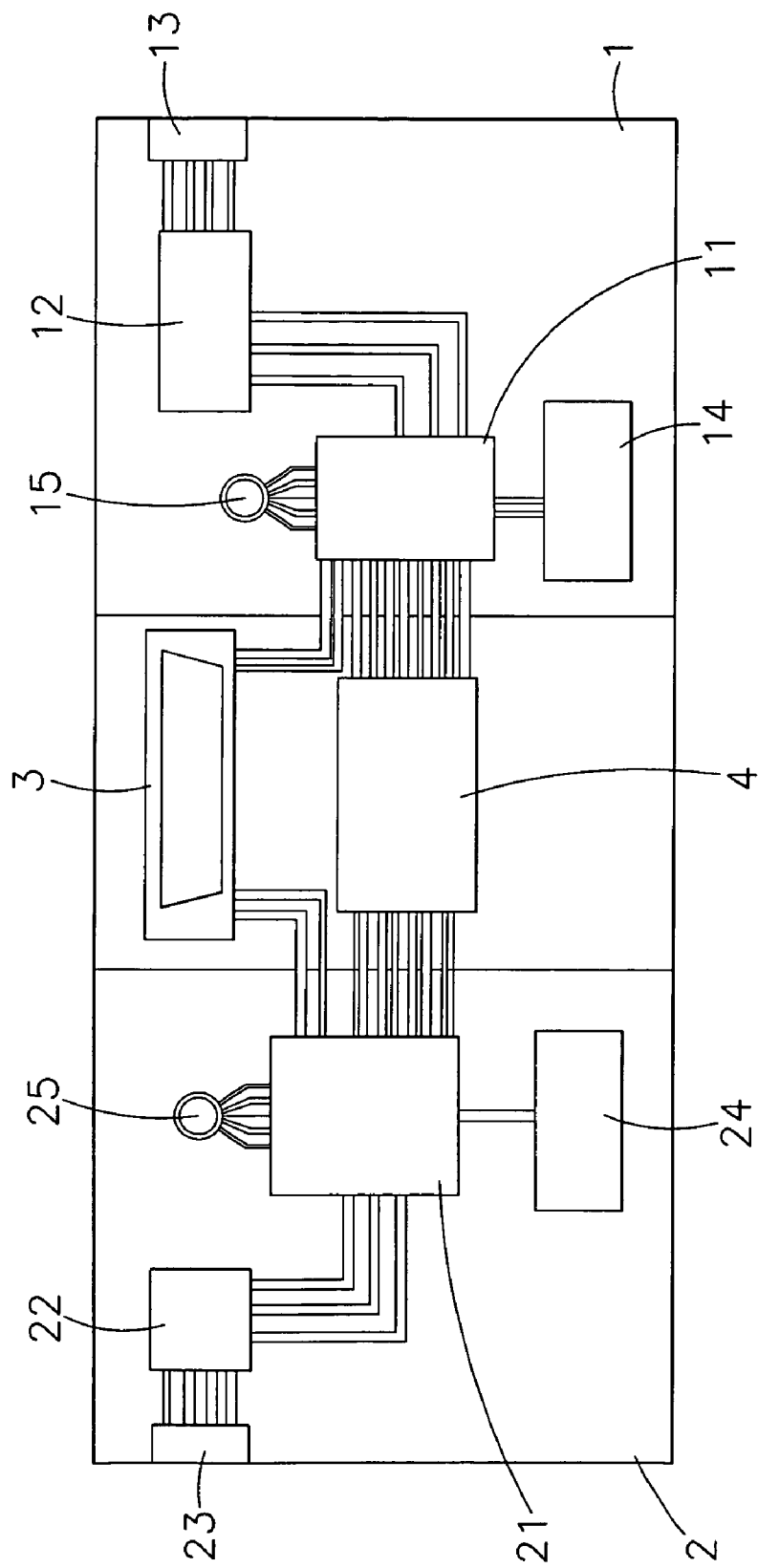
FIG. 1 is a plane drawing of the present invention.
Figure 2:
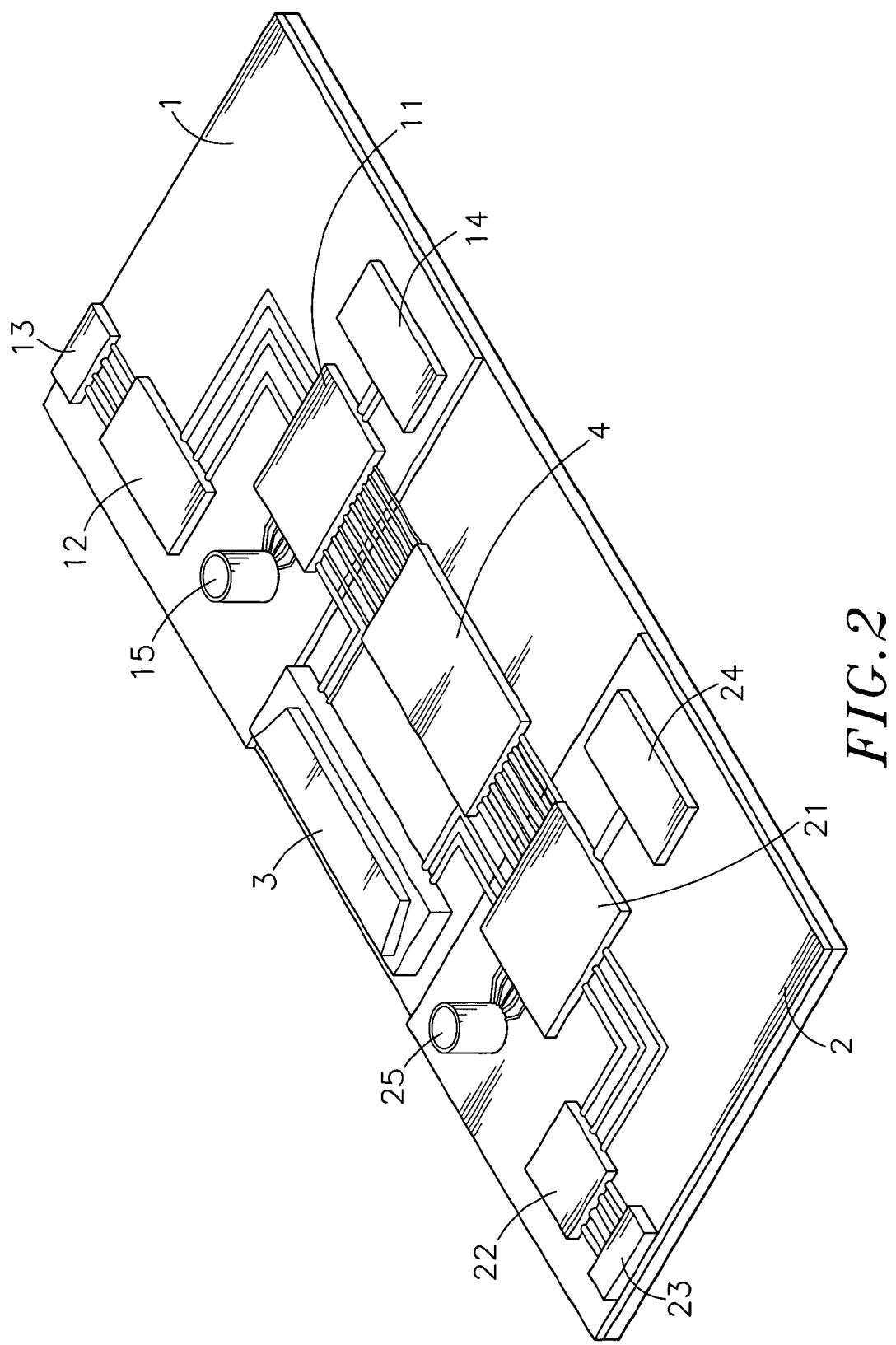
FIG. 2 is a three-dimensional appearance drawing of the present invention.

Refer to FIGS. 1~2, which are a plane drawing and a three-dimensional appearance drawing of the present invention respectively. As shown clearly in these figures, the present invention deals with NFC signal transmission of mobile communication equipments, wherein the wireless communication device comprises a ZigBee communication module 1, a Bluetooth communication module 2, a power supply circuit 3 and a signal conversion/transmission circuit 4, all of which are connected, wherein:

The ZigBee communication module 1 consists of a master central processing unit (CPU) 11, which is equipped with a ZigBee communication chip 12 that can process information packets, and the ZigBee communication chip 12 is connected with a ZigBee communication antenna 13 capable of sending or receiving signals of information packets. Besides, the master CPU 11 is connected with a ZigBee memory 14, which may be a flash memory to store the information packets temporarily and delete these packets after they are processed. The master CPU 11 is further connected with a display component 15 used to indicate the status of signal transmission when the ZigBee communication module 1 transmits signals, and the ZigBee communication is defined in IEEE 802.15.4 specifications.

The Bluetooth communication module 2 includes a master Bluetooth central processing unit (CPU) 21, which contains a Bluetooth communication chip 22 that can process information packets and is further linked with a Bluetooth communication antenna 23 through the Bluetooth communication chip 22 to transfer or receive signals of information packets, and the master Bluetooth CPU 21 includes a Bluetooth memory 24, which may be a flash memory to store signals of information packets temporarily. In addition, the master CPU 21 includes a display component 25 to monitor the status of signal transmission from the Bluetooth communication module 2 and the Bluetooth communication is defined in IEEE 802.15.1 specifications.

The power supply circuit 3 is a power supply unit, which may be a Li-Ion, alkaline or mercury cell that can constitute an independent power supply component. With support of the signal conversion/transmission circuit 4, it enables conversion and transmission of the ZigBee and Bluetooth signals.

For assembly of the aforesaid components, the power supply circuit 3 and the signal conversion/transmission circuit 4 are respectively connected in series between the master CPU 11 of the ZigBee communication module 1 and the master Bluetooth CPU 21 of the Bluetooth communication module 2, and the signal conversion/transmission circuit 4 can be used to process flows of information packets between the ZigBee communication module 1 and the Bluetooth communication module 2. Then, the ZigBee communication module 1 transmits an information packet to the signal conversion/transmission circuit 4, which will further send the information packet to the Bluetooth communication module 2 for follow-up processing; if the information packet is transmitted from the Bluetooth communication module 2 to the signal conversion/transmission circuit 4, it will also be transmitted via the signal conversion/transmission circuit 4 to the ZigBee communication module 1 for follow-up processing.

The ZigBee communication module 1 may be embedded in an electronic device and connected in series with the Bluetooth communication module 2 in the electronic device, and the electronic device may be a PC, notebook PC, mobile phone, PDA mobile phone, OBU or any other electronic product.

The ZigBee communication module 1 and the Bluetooth communication module 2 are respectively connected with the display component 15 and Bluetooth display component 25 that can indicate transmission of information. And the display component 15 and Bluetooth display component 25 are component with display capabilities, which may be made of light emitting diode (LED) and liquid crystal display (LCD), etc, and can display the transmission status of information packets in the Bluetooth communication module 2 and the ZigBee communication module 1.

After the ZigBee communication module 1 and Bluetooth communication module 2 receives information packets from the signal conversion/transmission circuit 4, the ZigBee communication module 1 will choose to receive the information packets from an external NFC or ZigBee communication device via the ZigBee communication antenna 13, while the Bluetooth communication module 2 will select to receive the information packets from an electronic device that is connected with it via the Bluetooth communication antenna 23.

Figure 3:
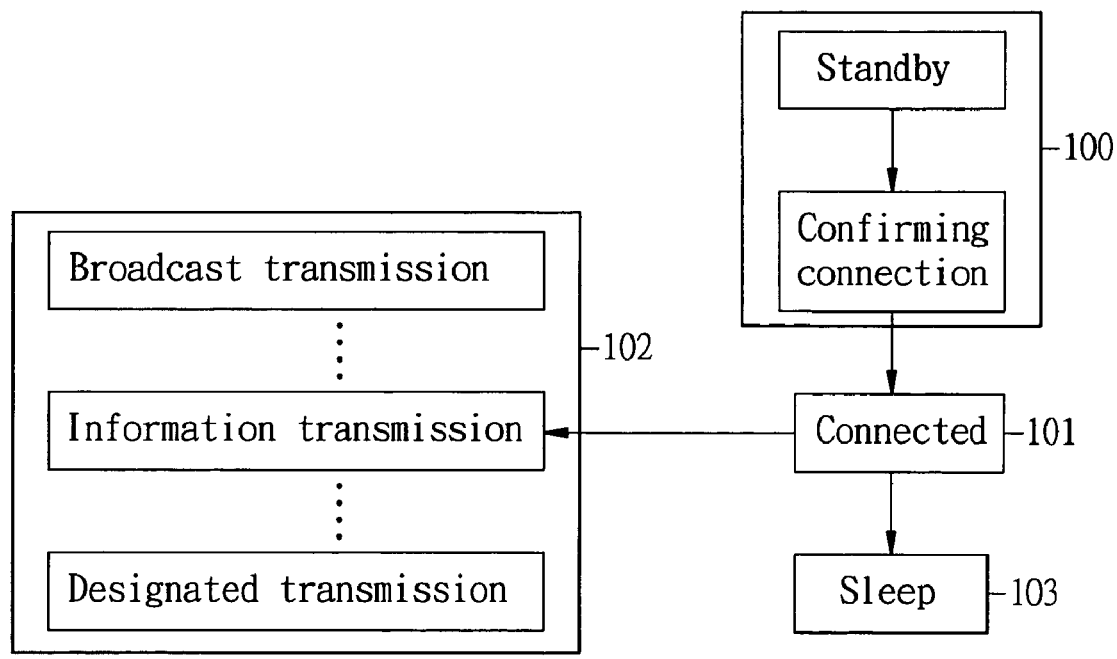
FIG. 3 is a block diagram illustrating communication of the present invention.

Refer to FIGS. 1~3, which are a plane drawing, a three-dimensional appearance drawing and a block diagram illustrating communication of the present invention respectively. As shown clearly in these figures, the NFC device of the present invention will enter into the standby mode after it is powered on (100), and will go into the connected mode following confirmation of connectivity (101). When the ZigBee communication module 1 of the NFC device receives information packets from another ZigBee communication module 1, the information packets will be transmitted through the signal conversion/transmission circuit 4 to the Bluetooth communication module 2 of the NFC device, which will further transfer the information packets to the electronic device with which the NFC device is connected. However, if the information packets are transmitted by the electronic device to the Bluetooth communication module 2 of the NFC device, these packets shall be transmitted via the signal conversion/transmission circuit 4 to the ZigBee communication module 1 of the NFC device, which then further delivers the information packets to the ZigBee communication module 1 of another NFC device. In the connected mode (102), the electronic device can utilize the functions of the NFC device to broadcast information packets and transmit designated information packets. If there is no information to be transmitted or received, the connected mode of the NFC device will shift to the sleep mode (103). If there is any information packet to be transmitted, the NFC device will enter into the connected mode (101 and 102) for information transmission. And in the sleep mode (103), it will only process receipt of information packets.

The N-Fi communication protocol, ZigBee memory 14 and master CPU 11 are required to enable near field informatics by using NFC devices. The ZigBee memory 14 can store information packets temporarily, while the master CPU 11 can store information packets and drivers permanently. The drivers can be used to identify if information packets comply with the N-Fi communication protocol. Therefore, all information packets received and transmitted by the NFC device must comply with the N-Fi communication protocol; otherwise, they will be considered as incomplete and be deleted.

The contents of the N-Fi communication protocol include a 6-byte source IP code, a 6-byte destination IP code, a 2-byte pan ID code, a 1-byte sequence number code, a 2-byte continue ID code, a 1-byte object ID length code, an object ID code and an object content code, wherein the bytes of the object ID code are not fixed and depend on the object ID length code. The bytes of the object content code are not fixed, either, and depend on the function of the object ID and the sequence number code. And it is likely that the object content does not exist in the contents of the N-Fi communication protocol. Each NFC device stores a 6-byte unique ID code and 2-byte pan ID code in the ZigBee memory 14 for the master CPU 11 to operate and process.

Usually, the 6-byte source IP code in the N-Fi communication protocol is used as the unique ID code for the NFC device that sends the information packet or for the source of the information packet; the 6-byte destination IP code is used to identify the device or destination to which the information packet is sent, or the device or destination which receives the information packet. The unique ID code is required to be consistent with the destination IP code.

The 2-byte continue ID code can be used to indicate total number of n-packets or of transferring the information packet. The significance of the total number lies in that when the bytes of the information packet are larger than the maximum allowable bytes of the information packet of the NFC device to be transferred at one time, the mechanism of the N-Fi communication protocol will be utilized to split the information packet into n-packets, and the information will be transmitted again in combination with the object ID code for combining n-packets. The total number of the n-packets of the information packet will be recorded in the continue ID code.

If the object ID code of the information packet received by the NFC device is the object ID code for combining n-packets, the continue ID code will be considered as the total number of the n-packets. And if the object ID code of the information packet is the object ID code of the information packet to be transferred, the continue ID code indicates the times the information packet needs to be transferred, and every time the information packet is transferred, the times of transferring will reduce by one and rewritten into the continue ID code.

The 1-byte sequence number in the N-Fi communication protocol is used to indicate the use pattern and serial number code of the information packet, wherein the use pattern is intended to indicate if the information packet includes an object content code, while the serial number code is intended to indicate the serial number of the information packet.

The ZigBee communication module 1 of the NFC device contains a preset 6-byte information packet inside the master CPU 11. When an NFC device is powered on, the ZigBee memory 14 will read the preset 6-byte information packet as the unique ID code for the NFC device in the master CPU 11, and set the 2-byte pan ID code of the NFC device to be 0xFF and 0xFF.

Figure 4A:
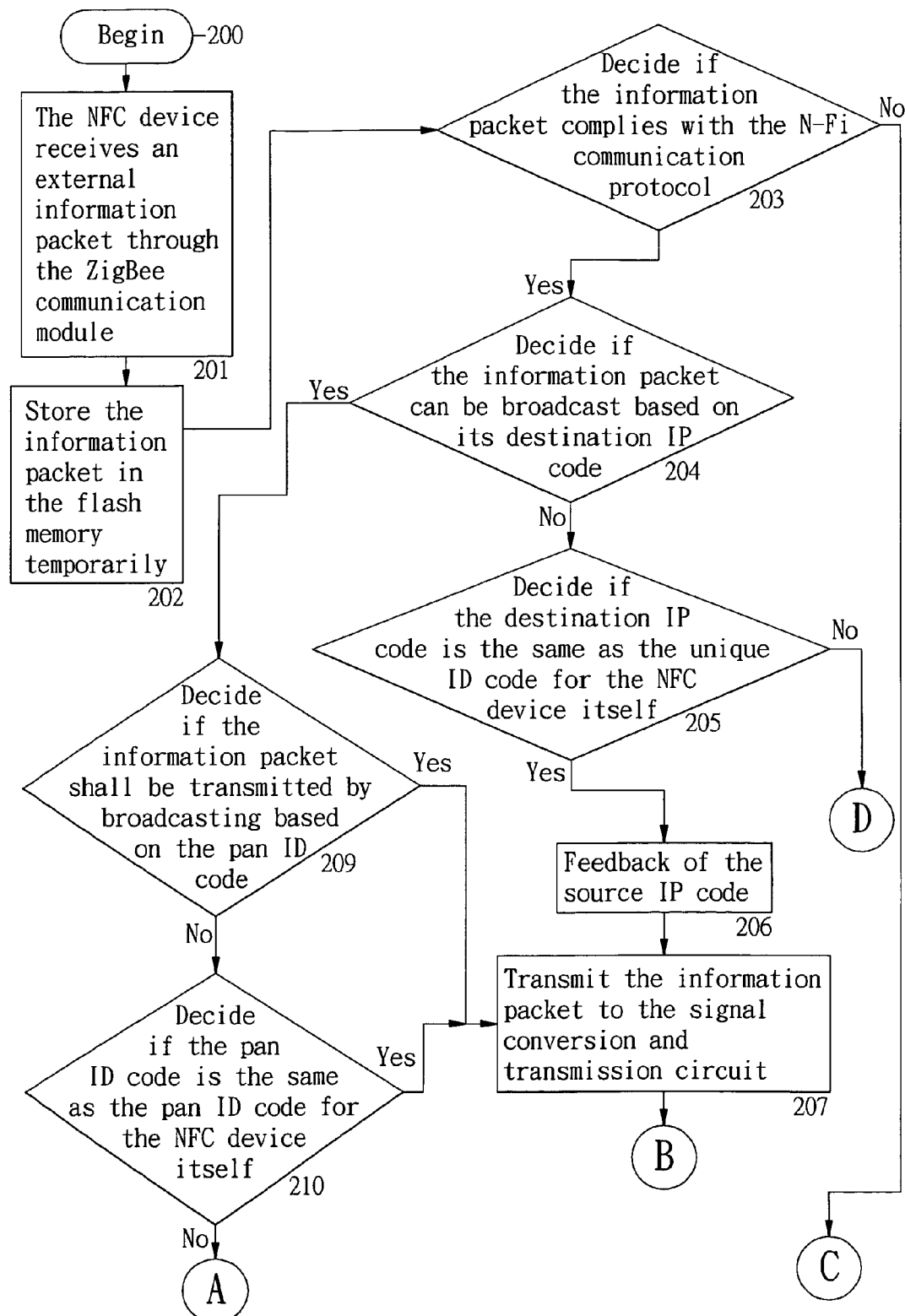
FIG. 4a is a flow chart illustrating the present invention receiving information packets.
Figure 4B:
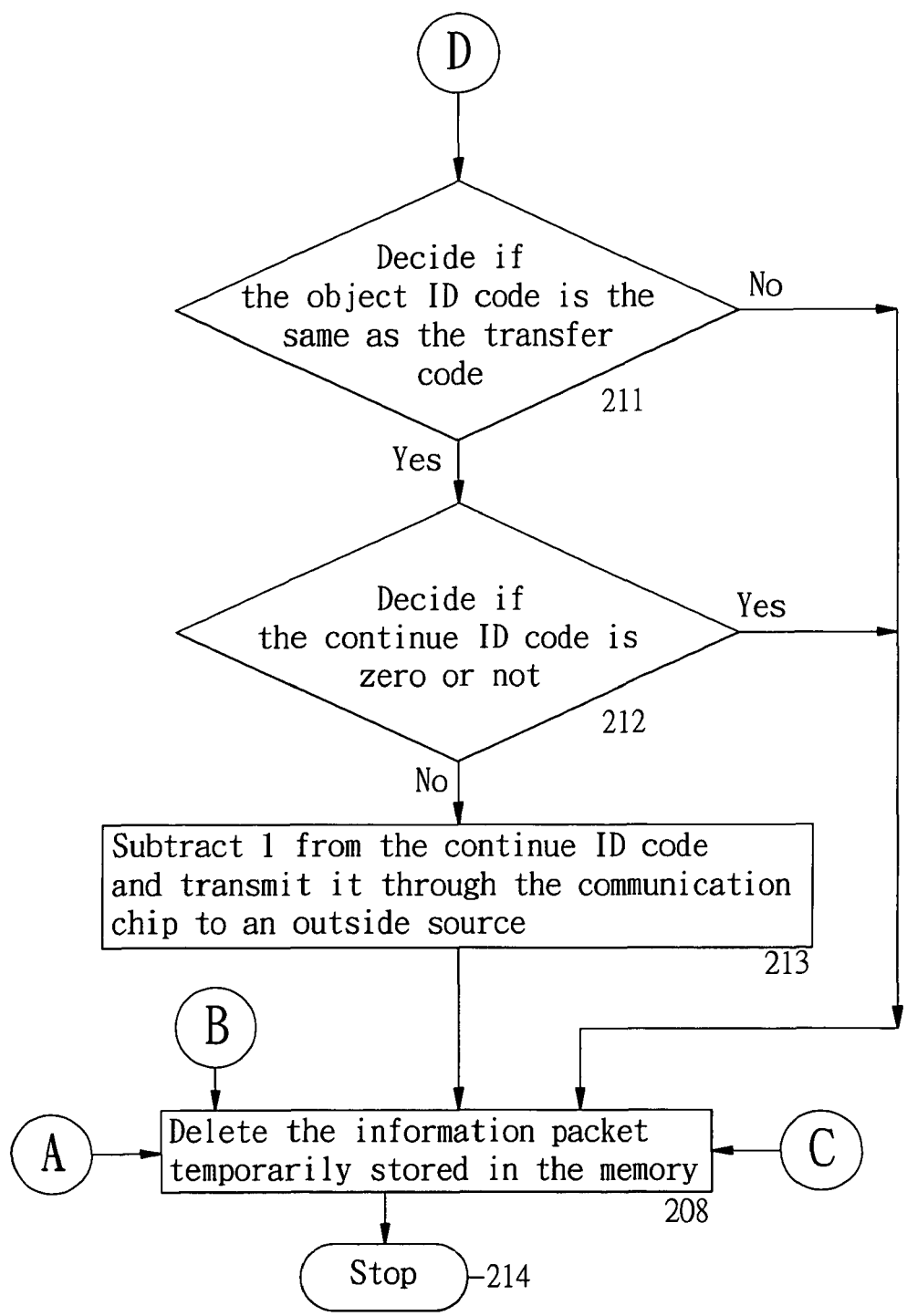
FIG. 4b is a flow chart illustrating the present invention receiving information packets.

Turn to FIGS. 1~2&4, which are a plane drawing and a three-dimensional appearance drawing of the present invention as well as a flow chart illustrating the present invention receiving information packets. These figures clearly show the steps for the NFC device of the present invention to receive information packets as follows:

(200) Begin to receive an information packet.
(201) The NFC device receives an external information packet through the ZigBee communication module 1.
(202) Store the information packet received by the ZigBee communication module 1 in the ZigBee memory 14 (Flash Memory) temporarily.
(203) The ZigBee master CPU 11 decides if the information packet received complies with the standards of the N-Fi communication protocol; if not, or the information packet does not comply with the standards of the N-Fi communication protocol, proceed to step (208), and the information packet temporarily stored in the ZigBee memory 14 will be deleted; if yes, the information packet remains to be stored temporarily in the ZigBee memory 14, and proceed to step (204) for follow-up operation and processing.
(204) Decide if the information packet can be broadcast based on its destination IP code; if every byte of the 6-byte destination IP code is 0xFF (represented by a hex value of FF), the information packet can be transmitted by Ad Hoc Networking Access. That is to say, if the unique ID code for the information packet is not the same as that for the NFC device itself, the information packet will still be stored temporarily in the ZigBee memory 14 and then proceed to step (209) for follow-up operation and processing; if the information packet can not be transmitted by Ad Hoc Networking Access according to the 6-byte destination IP code, indicating that the information packet shall be transmitted to a designated user, proceed to step (205).
(205) Identify the destination IP code and decide if the 6-byte destination IP code is the same as the unique ID code for the NFC device itself; if yes, i.e. the destination IP code of the information packet is the same as the unique ID code for the NFC device itself, the information packet remains stored in the ZigBee memory 14 temporarily and proceed to step (206) for follow-up operation and processing; otherwise, proceed to step (211) for follow-up operation and processing.
(206) The NFC device that receives the designated information packet will transmit back an information packet confirming receipt to the sending NFC device; the destination IP code of the information packet that confirms receipt is the unique ID code of the NFC device that sends the information packet; the source IP code is the unique ID code for the NFC device that receives the designated information packet; following feedback of the source IP code, proceed to step (207).
(207) Transmit the information packet temporarily stored in the ZigBee memory 14 to the signal conversion and transmission circuit 4, and then proceed to step (208).
(208) Delete the information packet temporarily stored in the ZigBee memory 14.
(209) Use the 2-byte pan ID code in the N-Fi communication protocol to decide to which device or destinations the pending information packet shall be transmitted; identify the pan ID code and decide if every byte of the 2-byte pan ID code of the information packet is 0xFF (indicated by a hex value of FF). If yes, namely, every byte is 0xFF, it indicates that the information packet shall be transmitted by Ad Hoc Networking Access. That is to say, if the 2-byte pan ID code of the information packet is not the same as the unique pan ID code of the NFC device itself, proceed to step (207) and transmit the information packet stored temporarily in the ZigBee memory 14 to the signal conversion/transmission circuit 4, and then proceed to step (208) and delete the information packet stored temporarily in the ZigBee memory 14; if not, namely, no byte of the 2-byte pan ID code is 0xFF, the information packet is a packet designated for group Ad Hoc Networking Access and remains stored temporarily in the ZigBee memory 14, and proceed to step (210) for follow-up operation and processing.
(210) Decide if the pan ID code of the information packet is the same as that of the NFC device itself; if yes, i.e. the pan ID code of the information packet is the same as that of the NFC itself, the information packet will be stored in the ZigBee memory 14 temporarily; proceed to step (207) and transmit the information packet temporarily stored in the ZigBee memory 14 to the signal conversion/transmission circuit 4, then proceed to step (208) and delete the information packet temporarily stored in the ZigBee memory 14; if not, proceed to step (208) directly and delete the information packet temporarily stored in the ZigBee memory 14.
(211) Decide if the object ID code of the information packet is the one transferred by the information packet; if yes, indicating that the object ID code of the information packet is the one transferred by the information packet, proceed to step (212); if not, namely, the object ID code of the information packet is not the one transferred by the information packet, proceed to step (208).
(212) Decide if the continue ID code of the information packet is zero or not; if yes, indicating the continue ID code of the information packet is zero, proceed to step (208) and delete the information packet stored in the ZigBee memory 14 temporarily; if not, the continue ID code of the information packet is not zero, proceed to step (213).
(213) Subtract (1) from the continue ID code of the information packet and transmit it through the ZigBee communication chip 12 to an outside source. Finally, proceed to step (208) and delete the information packet temporarily stored in the ZigBee memory 14.

In addition, if the object ID code of the information packet is not the object ID code transferred by the information packet, proceed to step (208) and delete the information packet stored in the ZigBee memory 14 temporarily.

(214) stop receiving the information packet.

Figure 5A:
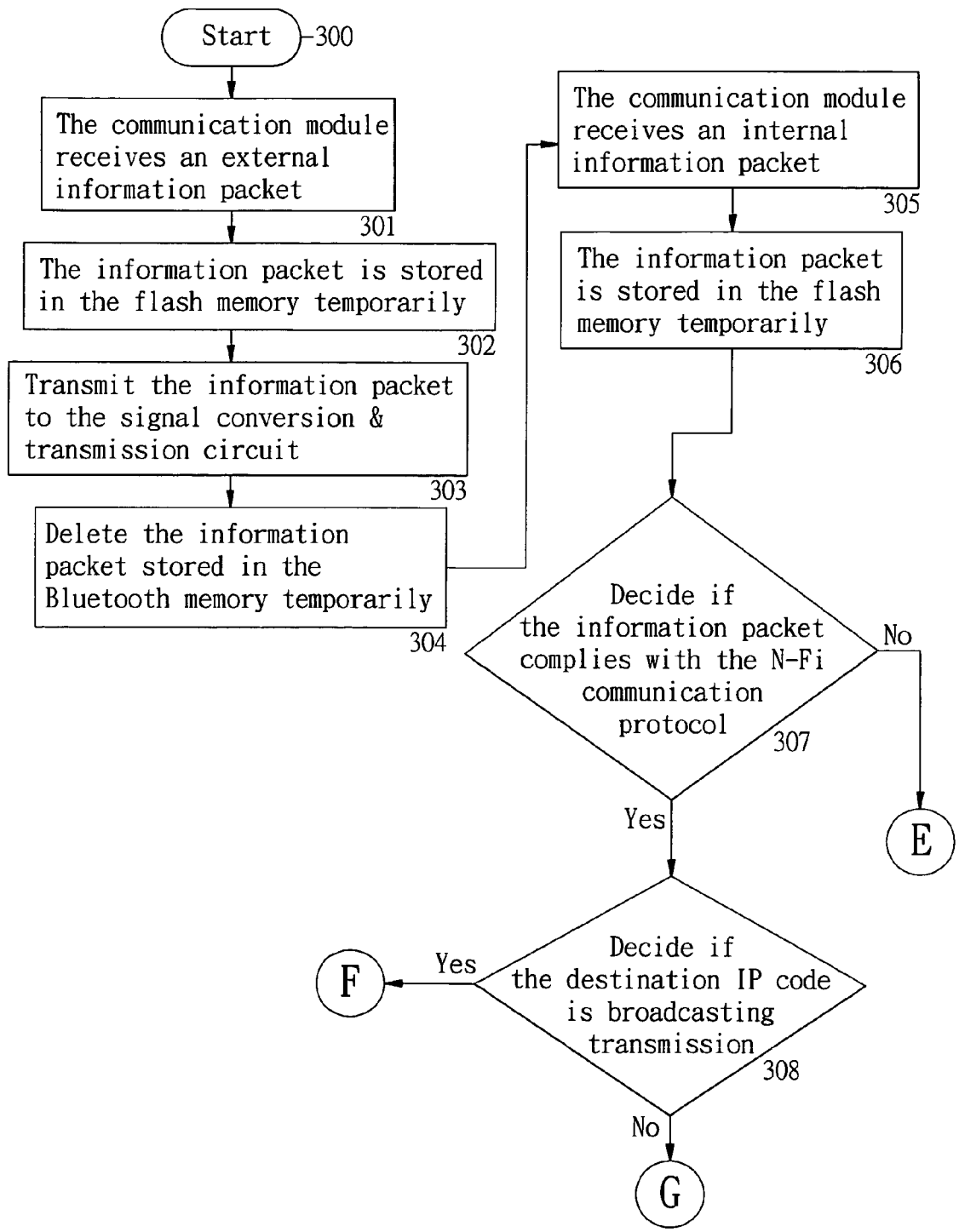
FIG. 5a is a flow chart illustrating transmission of information packets in the present invention.
Figure 5B:
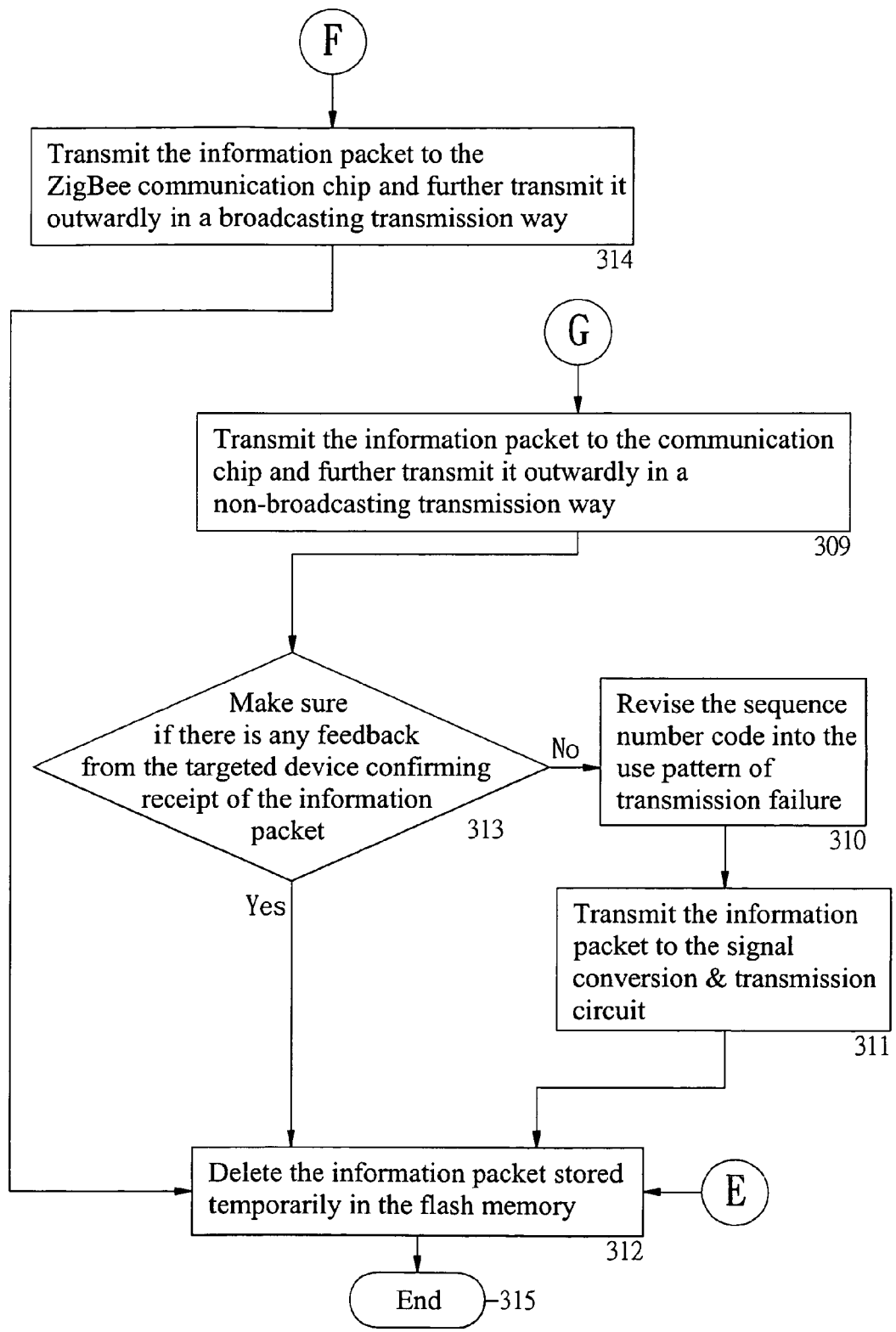
FIG. 5b is a flow chart illustrating transmission of information packets in the present invention.
Figure 6:
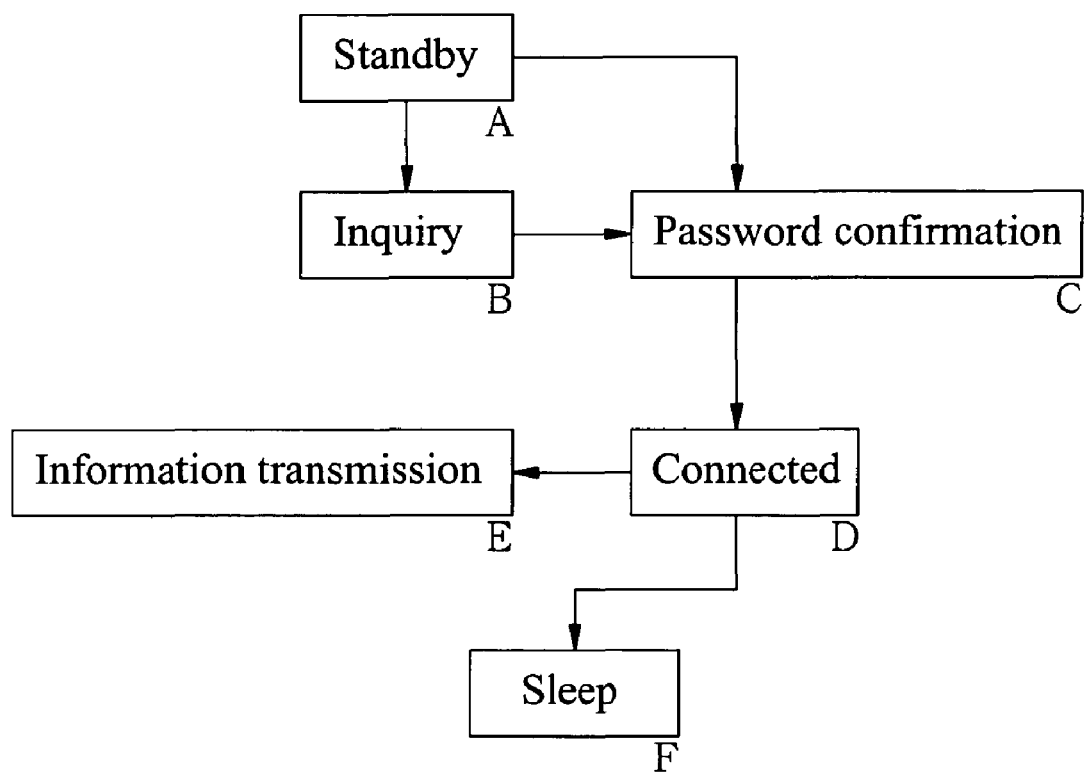
FIG. 6 is a block diagram illustrating communication of a conventional Bluetooth device.

Refer to FIGS. 1~2&5, which are a plane drawing and a three-dimensional appearance drawing of the present invention as well as a flow chart illustrating transmission of information packets in the present invention respectively. These figures clearly show the flow chart of steps for the NFC device of the present invention to send information packets as follows:

(300) Start to send an information packet.

(301) When sending an information packet, any electronic device connected with an NFC device will transmit the information packet through the Bluetooth communication module 2 of the electronic device to the Bluetooth communication module 2 of a wireless communication device that will receive such external information packet.

(302) The information packet will be stored in the Bluetooth memory 24 temporarily.

(303) The information packet will be transmitted to the signal conversion/transmission circuit 4.

(304) Delete the information packet that is stored in the Bluetooth memory 24 temporarily.

(305) The ZigBee communication module 1 receives the information packet from the signal conversion/transmission circuit 4.

(306) The information packet will be temporarily stored in the ZigBee memory 14.

(307) Use the ZigBee master CPU 11 to decide if the information packet complies with the N-Fi communication protocol; if not, it indicates that the information packet does not comply with the N-Fi communication protocol, then proceed to step (312) and delete the information packet temporarily stored in the ZigBee memory 14; if yes, the information packet complies with the N-Fi communication protocol and proceed to step (308).

(308) Decide if the destination IP code of the information packet is Ad Hoc Network transmission; if yes, it indicates that the destination ID code of the information packet is Ad Hoc Network transmission and proceed to step (314); if not, the destination IP code of the information packet is not Ad Hoc Network transmission, or the information packet is transmitted to a designated user, and then proceed to step (309).

(309) The information packet will be transmitted to the ZigBee communication chip 12 and further transmitted outwardly through the ZigBee communication antenna 13 in a non-Ad Hoc Network transmission way. Then execute step (313) and determine if there is a feedback from the targeted device confirming receipt of the information packet; if yes, it indicates that there is a feedback confirming receipt of the information packet, proceed to step (312) and delete the information packet temporarily stored in the ZigBee memory 14; if not, it indicates no feedback from the targeted device confirming receipt of the information packet, again proceed to step (309) and transmit the information packet to the ZigBee communication chip 12 which will transmit it outwardly via the communication antenna 13, and make sure if there is any feedback from the targeted device confirming receipt of the information packet. If there is no feedback from the targeted device confirming receipt of the information packet after step (309) has been executed consecutive three times, proceed to step (310).

(310) Revise the sequence number code of the information packet into the use pattern of transmission failure.

(311) Transmit the information packet that fails of transmission to the signal conversion/transmission circuit 4 to notify the NFC user of transmission failure and that the information is not transmitted to the targeted device.

(312) Delete the information packet stored temporarily in the ZigBee memory 14.

(313) Make sure if there is any feedback from the targeted device confirming receipt of the information packet.

(314) Transmit the information packet to the ZigBee communication chip 12 and deliver it outwardly via the ZigBee communication antenna 13 by Ad Hoc Networking Access, and then proceed to step (312)

(315) Stop sending the information packet.

The following example of embodiment is given to describe the application of N-Fi communication protocol in the near field life information sharing system, near field chat and dating system, near field online gaming system and near field short message springboard sending system.

Within the communication range, wireless communication devices constitute an NFC network that can send information packets actively or receive information packets passively, and such wireless communication network can communicate with at least seven NFC devices or electronic devices with the ZigBee communication module 1 simultaneously.

In a near field life information sharing system, if a roadside shop wants to release information on product promotions to nearby NFC device users by using NFC devices, it must be ensured that the information to be released comply with the N-Fi communication protocol. And the contents of each information packet should include a 6-byte source IP code, a 6-byte destination IP code, a 2-byte pan ID code, a 1-byte sequence number code, a 2-byte continue ID code, a 1-byte object ID length code, an object ID code and an object content code.

When releasing information on product promotions to all nearby NFC device users, a roadside shop needs to utilize the function of broadcast transmission and group Ad Hoc Networking Access. In such case, the sequence number code is the automatic serial number of the NFC device in the absence of continuous transmission, while the source IP code is obtained by reading the unique ID code of the NFC device used by the roadside shop, and all bytes of both the destination IP and pan ID codes are 0xFF; the sequence number code is numbered as 0x00 automatically, and the continue ID code is set to be (0x00) (0x00). The object ID length code of the promotion information is (0x02), indicating that the object ID length is 2 bytes; the object ID code for the promotional information is (0x13) (0x20), and the object contents for the promotional information shall include four information items: the person that releases the information, level of the information, type of the information and contents of the information.

Information items of the object content are represented by information pattern (1 byte constantly), information length (1 byte constantly) and main body of the information which are arranged in the right order, wherein the information length indicates total bytes of the main body, while the information pattern indicates whether the main body of the information is represented by characters, numbers or symbols, etc. Take the information on product promotions and level of the information for example, if the bytes of the person that releases the information are (0x0e) (0x06) (0x00) (0x05) (0x35) (0x25) (0x30) (0x46), the information pattern will be (0x0e), indicating that the main body of the information is characters; the information length is (0x06), indicating that the main body of the information includes 6 bytes, which are (0x00) (0x05) (0x35) (0x25) (0x30) (0x46) respectively. Convert the main body of the information into characters based on the Unicode (UTF-8), and it will be (5% OFF). If the bytes of level of the information are (0x13) (0x01) (0x03), the information pattern will be (0x13), indicating that the main body of the information is represented by numbers; the information length is (0x01), indicating there is only 1 byte in the main body of the information; the main body of the information is (0x03), indicating that the level of the information is Level 3.

In the near chat and dating system, if NFC device user A wants to send chat messages to NFC device user B, the information packets to be sent must comply with the N-Fi communication protocol, and shall contain a 6-byte source IP code, a 6-byte destination IP code, a 2-byte pan ID code, a 1-byte sequence number code, a 2-byte continue ID code, a 1-byte object ID length code, an object ID code and an object content code.

Designated transmission shall be applied to any chat message sent by NFC device user A to NFC device user B, and the sequence number code is the automatic serial number of the NFC device in the absence of continuous transmission. The source IP code is obtained by reading the unique ID code of User A's NFC device, and the destination IP code can be obtained by reading the unique ID code of User B's NFC device; every byte of the pan ID code is 0xFF; the sequence number code is numbered as 0x10 automatically, and the continue ID code is set to be (0x00) (0x00). The object ID length code of the chat message is (0x03), indicating that its object ID length is 3 bytes; the object ID code for the chat message is (0x33) (0x20) (0x01), and the object contents for the chat message are just the words in the chat message. If the words in the chat message are (Test), the bytes for these words will be (0x0e) (0x06) (0x00) (0x04) (0x54) (0x65) (0x73) (0x74). The information pattern is (0x0e), indicating that the main body of this information is characters; the information length is (0x06), indicating that the main body of this information include 6 bytes, which are (0x00) (0x04) (0x54) (0x65) (0x73) (0x74). After being converted into characters based on Unicode (UTF-8), the main body of this information will be (Test).

In the near field online gaming system, NFC device users A, B and C can transmit information packets of near field online games among them. If NFC device user A wants to send an information packet to NFC device users B and C at the same time, it shall be ensured that the information packet must comply with the N-Fi communication protocol, and shall include a 6-byte source IP code, a 6-byte destination IP code, a 2-byte pan ID code, a 1-byte sequence number code, a 2-byte continue ID code, a 1-byte object ID length code, an object ID code and an object content code.

When NFC device user A transmits a piece of information on games to NFC device users B and C at the same time, if he wants this information to be received only by NFC device users B and C who are play games, he will make use of the functions of broadcast transmission and designated group. The sequence number code is the automatic serial number of the NFC device, and the function of continuous transmission is not required.

For the near field short message springboard sending system, if NFC device user A wants to send a text message to NFC device user B beyond the communication range of the NFC device used by User A, but NFC device user C is located between User A and User B, NFC device user A can use this system as a springboard to transmit the text message. However, the information packets to be released must comply with the N-Fi communication protocol.

When NFC device user A relies on NFC device user C as a springboard to transmit a text message to NFC device user B, the sequence number code of the text message will be the automatic serial number of the NFC device and continuous transmission is required, so the object ID code needs to have the continue ID code included. The source IP code is obtained by reading the unique ID code of User A's NFC device, and all bytes of both the destination IP code and pan ID code are 0xFF; the sequence number code is numbered as 0x40 automatically, and the continue ID code is set to be (0x00) (0x03), indicating that the information can be transferred at most 3 times. In another way, at most 3 intermediary springboards can be utilized; the object ID length code for this springboard text message is (0x02), indicating that the object ID length is 2 bytes, and the object ID code for this message is (0x03) (0x99); the object content code for this message is the contents of this text message.

The aforesaid descriptions are given to illustrate an example of the preferred embodiment of the present invention and shall not be construed as limiting the scope of the patent claims of the present invention. All modifications and equivalent structural changes made in accordance with the patent claims and descriptions of the present invention shall be included in the patent claims of the present invention.

What the invention claimed is:

1. A near field communication (NFC) device, more particularly, to a device capable of near field communication by using ZigBee and Bluetooth communication modules, the NFC device at least comprising: a ZigBee communication module, a Bluetooth communication module, a signal conversion/transmission circuit and a power supply circuit, wherein:

the ZigBee communication module includes a master central processing unit (CPU) capable of processing N-Fi communication protocol, identifying and enabling ZigBee communication, and the master CPU is connected with a communication chip that can transmit or receive ZigBee-based information packets; the ZigBee communication module is equipped with a ZigBee memory that can temporarily store ZigBee-based information packets that have been processed, transmitted or received and delete these information packets after processing;

the Bluetooth communication module includes a master Bluetooth CPU that can control processing of Bluetooth communication, and this master Bluetooth CPU is connected with a Bluetooth communication chip capable of sending or receiving Bluetooth-based information packets; in addition, the Bluetooth communication module is equipped with a Bluetooth memory that can temporarily store Bluetooth-based information packets processed, transmitted or received and delete these information packets after processing;

the signal conversion/transmission circuit is used to process internal transmission of information packets inside the ZigBee and Bluetooth communication modules;

and the power supply circuit is electrically connected between the ZigBee and Bluetooth communication modules, and is a power supply unit that can provide electricity to the Bluetooth and ZigBee communication modules as needed.

2. The NFC device according to claim 1, wherein the Bluetooth and ZigBee communication modules are respectively equipped with display components capable of indicating information transmission and displaying transmission status of information packets in the Bluetooth and ZigBee communication modules; the display components may be light emitting diode (LED) or liquid crystal display (LCD) components with display capability.

3. The NFC device according to claim 1, wherein the power supply circuit may be a power supply unit, which may be a Li-Ion, alkaline or mercury cell that constitutes an independent power supply component.

4. The NFC device according to claim 1, wherein the NFC device can be integrated into any Bluetooth-enabled electronic device, and the electronic device may be a PC, notebook PC, mobile phone, PDA mobile phone, on-board unit or any other electronic product.

5. The NFC device according to claim 1, wherein the NFC device constitutes an NFC network that can send information packets actively or receive information packets passively within its communication range, and such wireless communication network can communicate with at least seven NFC devices or electronic devices with the ZigBee communication module simultaneously.

6. The NFC device according to claim 1, wherein the contents of the N-Fi communication protocol include at least a 6-byte source IP code, a 6-bytedestination IP code, a 2-byte pan ID code, a 1-byte sequence number code, a 2-byte continue ID code, a 1-byte object ID length code, an object ID code.

7. The NFC device according to claim 6, wherein the contents of the N-Fi communication protocol further include an object content code.

8. The NFC device according to claim 7, wherein the number of bytes of the object content depends on the functions of the object ID code and sequence number code.

9. The NFC device according to claim 6, wherein the number of bytes of the object ID code depends on the object ID length.

10. The NFC device according to claim 6, wherein the 6-byte source IP code included in the contents of the N-Fi communication protocol is used as the unique ID code for the NFC device that sends the information packet or for the source of the information packet; the 6-byte destination IP code is used to identify the device or destination to which the information packet is sent, or the device or destination that receives the information packet; the unique ID code is required to be consistent with the destination IP code.

11. The NFC device according to claim 10, wherein the way to transmit information packets is applicable to near field life information sharing system, near field chat and dating system, near field online gaming system and near field short message springboard sending system.

12. The NFC device according to claim 1, wherein a preset 6-byte packet is stored in the master CPU, so that the ZigBee memory will read this 6-byte packet in the master CPU as the unique ID code for the NFC device as it is powered on.

13. The NFC device according to claim 1, wherein the NFC device receives and transmits information packets internally and externally in accordance with its receiving and transmitting process.

* * * * *